United States Patent [19]
Steber et al.

[11] Patent Number: 4,903,476
[45] Date of Patent: Feb. 27, 1990

[54] GAS TURBINE IGNITER WITH BALL-JOINT SUPPORT

[75] Inventors: Charles E. Steber, Scotia; Robert J. Travis, Schenectady; John A. Rizzo, Albany, all of N.Y.

[73] Assignee: General Electric Company, Schenectady, N.Y.

[21] Appl. No.: 289,892

[22] Filed: Dec. 27, 1988

[51] Int. Cl.[4] .............................................. F02C 7/266
[52] U.S. Cl. ................................ 60/39.32; 60/39.827; 431/264
[58] Field of Search ............ 60/39.827, 39.32, 39.828, 60/39.826, 39.821; 431/266, 265, 264, 263, 258

[56] References Cited

U.S. PATENT DOCUMENTS

| | | | |
|---|---|---|---|
| 2,880,792 | 4/1959 | Raskin | 431/266 |
| 3,007,312 | 11/1961 | Shutts | 60/39.32 |
| 3,879,940 | 4/1975 | Stenger et al. | 60/39.32 |
| 3,908,361 | 9/1975 | Gardiner | 60/39.32 |
| 3,924,403 | 12/1975 | Irwin | 60/39.828 |
| 4,216,651 | 8/1980 | Ormerod | 60/39.827 |
| 4,275,559 | 6/1981 | Blair | 60/39.827 |
| 4,441,323 | 4/1984 | Colley | 60/39.32 |
| 4,470,799 | 9/1984 | Riggs | 431/264 |
| 4,730,979 | 3/1988 | Hook Jr. | 60/39.32 |

FOREIGN PATENT DOCUMENTS

| | | | |
|---|---|---|---|
| 40336 | 3/1979 | Japan | 60/39.32 |

Primary Examiner—Donald E. Stout
Attorney, Agent, or Firm—Jerome C. Squillaro

[57] ABSTRACT

An igniter for a combustor of a gas turbine engine includes a body section mounted on a ball joint within a standoff cylinder. The standoff cylinder, in turn, is mounted on the casing of the combustor. An electrode tip, extending from the body section if tightly fitted into a hole in the combustor liner. The ball joint permits substantial transverse motion of the electrode tip to fit it through the hole during installation of the igniter, and to track the position of the hole if it should move relative to the casing due to differential thermal expansion during operation of the combustor. Seals between mating parts prevents the leakage of air from the interior of the casing.

4 Claims, 1 Drawing Sheet

GAS TURBINE IGNITER WITH BALL-JOINT SUPPORT

BACKGROUND OF THE INVENTION

The present invention relates to igniters and, more particularly, to igniters for igniting a fuel-air mixture in a combustor of a gas turbine engine.

An igniter for the combustor of a gas turbine engine permits the production of an electrical spark across a gap formed between oppositely charged electrodes. The spark so produced is effective for igniting a combustible fuel-air mixture within the combustor.

Of particular interest is an igniter disclosed in U.S. Pat. No. 4,275,559 wherein an igniter is affixed to a combustion chamber with the electrodes extending a short distance to an ignition position in the combustor. This device includes spring retention of the electrodes in the ignition position. The spring permits the electrodes to retract from the combustor in the presence of high pressure within the combustor, as occurs once ignition is attained.

The present invention is particularly concerned with non-retracting igniters wherein the igniter is affixed to a combustor casing and the electrodes extend inward through an opening a short distance to a fixed ignition position within the combustor liner.

It is desirable to avoid leakage of a large flow of air between the igniter electrode and the opening in the combustor liner. This desirable object is complicated by large differential thermal expansion of the casing and the liner, and by the stackup of manufacturing tolerances. This combination can have a cumulative effect of as much as 0.25 inch.

One way of decreasing leakage includes a sliding seal sealing between the igniter and an over-sized hole in the combustor liner. Experience has shown that sliding seals represent a substantial cost, and are thus avoided if possible.

Another way of avoiding leakage includes making the hole through the combustor liner a close fit to the igniter electrode. With the build-up of position errors due to the sum of manufacturing tolerances and differential thermal expansion, a rigidly mounted device of the referenced '559 patent, if fitted through a close-fitting hole in a combustor liner of a large gas turbine engine, would exert unacceptable forces on the combustor liner.

Other U.S. Pat. Nos. showing igniters for combustors of gas turbine engines are 4,125,998 and 4,597,260. It is believed that these patents are less relevant than the first-mentioned '559 patent.

OBJECTS AND SUMMARY OF THE INVENTION

It is an object of the invention to provide an igniter for a gas turbine engine which overcomes the drawbacks of the prior art.

It is a further object of the invention to provide an igniter for a gas turbine engine wherein an electrode is supported on a combustor casing through a ball joint, thus permitting transverse displacement of the tip of the igniter electrode in a small hole in a combustor casing.

Briefly stated, the present invention provides an igniter for a combustor of a gas turbine engine that includes a body section mounted on a ball joint within a standoff cylinder. The standoff cylinder, in turn, is mounted on the casing of the combustor. An electrode tip, extending from the body section is closely fitted into a hole in the combustor liner. The ball joint permits substantial transverse motion of the electrode tip to fit it through the hole during installation of the igniter, and to track the position of the hole if it should move relative to the casing due to differential thermal expansion during operation of the combustor. Seals between mating parts prevents the leakage of air from the interior of the casing.

According to an embodiment of the invention, there is provided a support for an igniter for a combustor of a gas turbine, the combustor being of a type including a casing and a liner within the casing, comprising: a ball joint, means for supporting the ball joint disposed a substantial distance outward from the casing, a body section of the igniter affixed in the ball joint, means for permitting the ball joint, and the body section to rotate through a substantial range, an igniter tip on the body section, a hole in the liner, the igniter tip entering through the hole and into an interior of the liner, the hole being a close fit to the igniter tip, whereby leakage past the igniter tip through the hole is limited, and the substantial range being sufficient to permit fitting the igniter tip in the hole in the presence of manufacturing tolerances, and to permit the igniter tip to track the hole in the presence of differential thermal expansion during operation.

According to a feature of the invention, there is provided a support for an igniter of a combustor of a gas turbine engine, the combustor being of a type including a casing and a liner within the casing, comprising: a standoff, means for affixing the standoff to the casing, a ball joint affixed at a distal end of the casing, an igniter body section affixed in the ball joint, the igniter body section passing through the standoff toward the liner, an igniter tip extending from the body section, a hole in the liner, the igniter tip extending through the hole and into the liner, the ball joint including a substantial angular range of motion, and the substantial angular range of motion being sufficient to permit insertion of the igniter tip through the hole during assembly of the combustor, and to permit the igniter tip to track the hole in the presence of differential thermal expansion during operation of the combustor.

The above, and other objects, features and advantages of the present invention will become apparent from the following description read in conjunction with the accompanying drawing.

DETAILED DESCRIPTION OF THE PREFERRED EMBODIMENT

Figure 1:
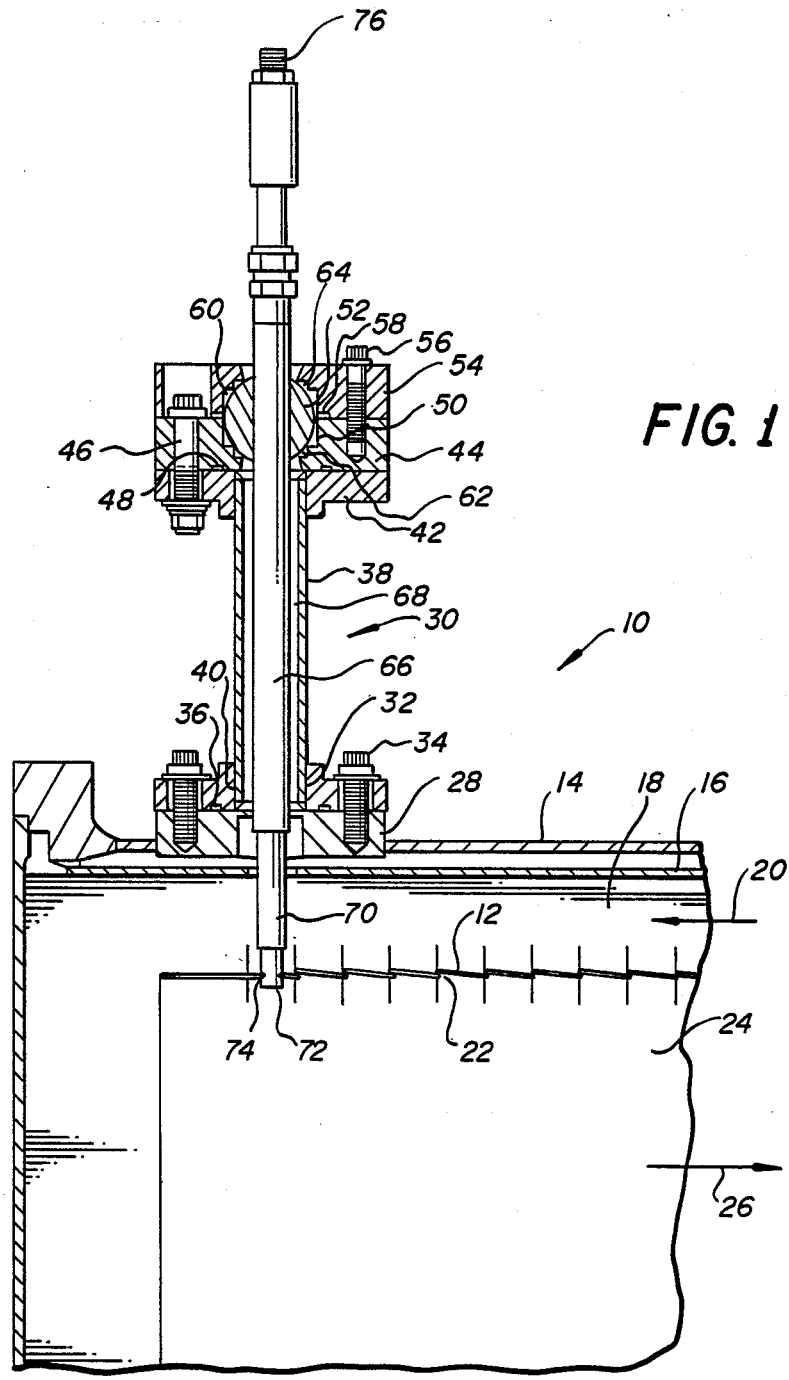
FIG. 1 is partial cross section of a combustor of a gas turbine engine showing an igniter mounting system according to an embodiment of the invention.

The following description is directed to an igniter for a gas turbine engine wherein the position of the electrodes is fixed. That is, the tips of the electrodes remain in an ignition position, just within a combustor liner, at all times. This should not be taken to preclude application of the present invention to a retractable igniter such as disclosed, for example, in the referenced '559 patent.

Referring to FIG. 1, there is shown, generally at 10, relevant portions of a gas turbine combustor. A combustor liner 12 is disposed within a combustor casing 14. A flow sleeve 16 is mounted within combustor casing 14 and spaced a substantial distance outward from combustor liner 12. The space between flow sleeve 16 and combustor liner 12 forms a portion of a plenum 18 receiving a flow of pressurized air 20 from a compressor (not shown). As is conventional, combustor liner 12 includes a plurality of slots 22 for permitting pressurized air to flow through combustor liner 12 to provide combustion, cooling and dilution air within an interior 24 of combustor liner 12. A conventional fuel nozzle (not shown) injects liquid or gaseous fuel into interior 24 where it is burned with the air entering through slots 22. A hot energetic exhaust flow of products of combustion, excess fuel and/or excess air move in a direction indicated by an arrow 26 toward turbine blades (not shown) to produce the desired work.

A mounting base 28 is affixed rigidly to combustor casing 14 by, for example, a peripheral weld. An igniter, shown generally at 30, includes a mounting flange 32 adapted for attachment to mounting base 28 using, for example, a plurality of bolts 34. A seal 36, between facing surfaces of mounting base 28 and 32, prevents air leakage therepast. A standoff cylinder 38 is affixed, at its lower end, in a hole 40 in mounting flange 32. An inner flange 42 is affixed to the outer end of standoff cylinder 38. An intermediate flange 44 is affixed to inner flange 42 using, for example, one or more bolts 46. A seal 48 between facing surfaces of inner flange 42 and intermediate flange 44 prevents air leakage therepast. Intermediate flange 44 includes a depression 50 for accommodating the lower hemisphere of a ball 52. An outer flange 54 is affixed atop intermediate flange 44 using, for example, one or more bolts 56. A seal 58 between facing surfaces of intermediate flange 44 and 54 prevents air leakage therepast. Outer flange 54 includes a depression 60 for accommodating the upper hemisphere of ball 52. An inner seal 62 in depression 50 makes rubbing and sealing contact with the lower hemisphere of ball 52. An outer seal 64 in outer flange 54 makes rubbing and sealing contact with the upper hemisphere of ball 52.

Inner seal 62 and outer seal 64 can be of any convenient material, however, carbon foil is preferred among presently available materials for its self-lubricating and heat-resisting properties.

A body section 66 is affixed in ball 52. It will be noted that a substantial clearance volume 68 is provided between an exterior surface of body section 66 and an interior surface of standoff cylinder 38. This permits body section 66 to rotate on ball 52 over a substantial distance within standoff cylinder 38. An electrode section 70 extends inward beyond an inner extremity of body section 66 toward combustor liner 12. An electrode tip 72 extends beyond electrode section 70, and through a tight-fitting hole 74 to position electrode tip 72 in an ignition position.

An electrical connector 76, at a distal end of body section 66, permits connection of a source of electricity (not shown) for producing a spark across electrode tip 72.

During installation of igniter 30 in gas turbine combustor 10, body section 66 is rotated on ball 52 as necessary to fit electrode tip 72 through hole 74 in combustor liner 12. This provides accommodation for a substantial amount of positioning errors inevitably resulting from manufacturing tolerances. During use, if differential thermal expansion causes a change in the relative positions of mounting base 28 and hole 74, a force is applied to electrode tip 72 by hole 74, resulting in the rotation of body section 66 about ball 52 as necessary to limit stresses applied to body section 66, even when hole 74 is tightly fitted about electrode tip 72.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A support for an igniter for a combustor of a gas turbine, said combustor being of a type including a casing and a liner within said casing, comprising:
   a ball joint;
   means for supporting said ball joint disposed a substantial distance outward from said casing;
   a body section of said igniter affixed in said ball joint;
   means for permitting said ball joint, and said body section to rotate through a substantial range;
   an igniter tip on said body section;
   a hole in said liner;
   said igniter tip entering through said hole and into an interior of said liner;
   said hole being a tight fit to said igniter tip, whereby leakage past said igniter tip through said hole is limited; and
   said substantial range being sufficient to permit fitting said igniter tip in said hole in the presence of manufacturing tolerances, and to permit said igniter tip to track said hole in the presence of differential thermal expansion during operation.

2. A support according to claim 1, further comprising at least one seal contacting a surface of said ball joint, said at least one seal being of a material effective to perform a sealing function and to resist high temperature.

3. A support according to claim 2, wherein said at least one seal is a carbon foil.

4. A support for an igniter of a combustor of a gas turbine engine, said igniter being of a type including a casing and a liner within said casing, comprising:
   a standoff cylinder;
   means for affixing said standoff cylinder to said casing;
   a ball joint affixed at a distal end of said standoff cylinder;
   an igniter body section affixed in said ball joint
   said igniter body section passing through said standoff cylinder toward said liner;
   an igniter tip extending from said body section;
   a hole in said liner;
   said igniter tip extending through said hole and into said liner;
   said ball joint including a substantial angular range of motion; and
   said substantial angular range of motion being sufficient to permit insertion of said igniter tip through said hole during assembly of said combustor, and to permit said igniter tip to track said hole in the presence of differential thermal expansion during operation of said combustor.

* * * * *